Oct. 26, 1965 R. W. SPROUL ETAL 3,214,691

FREQUENCY DIVERSITY COMMUNICATIONS SYSTEM

Filed May 13, 1960 5 Sheets-Sheet 1

INVENTORS
ROBERT W. SPROUL
MARTIN B. BRILLIANT
MARTIN OXMAN
ROBERT ALTER

By Kenway, Jenney, Witter & Hildreth
ATTY'S.

FREQUENCY DIVERSITY COMMUNICATIONS SYSTEM

Filed May 13, 1960 5 Sheets-Sheet 2

INVENTORS
ROBERT W. SPROUL
MARTIN B. BRILLIANT
MARTIN OXMAN
ROBERT ALTER
By Kenway, Jenney, Witter & Hildreth
ATTY'S FREQUENCY DIVERSITY COMMUNICATIONS SYSTEM
Filed May 13, 1960 5 Sheets-Sheet 3
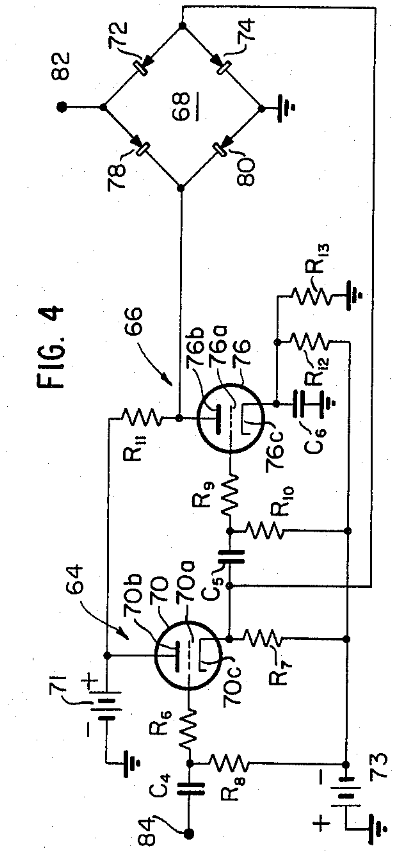
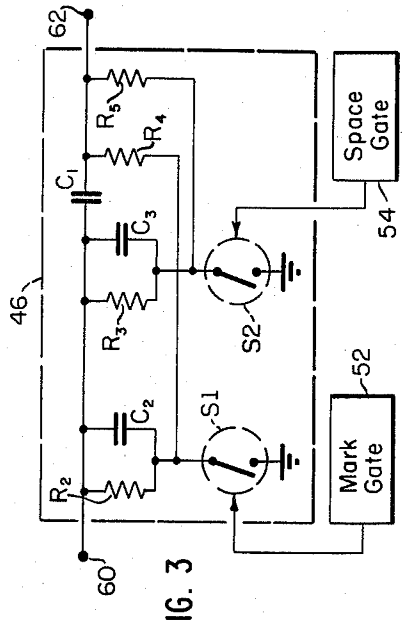
FIG. 3
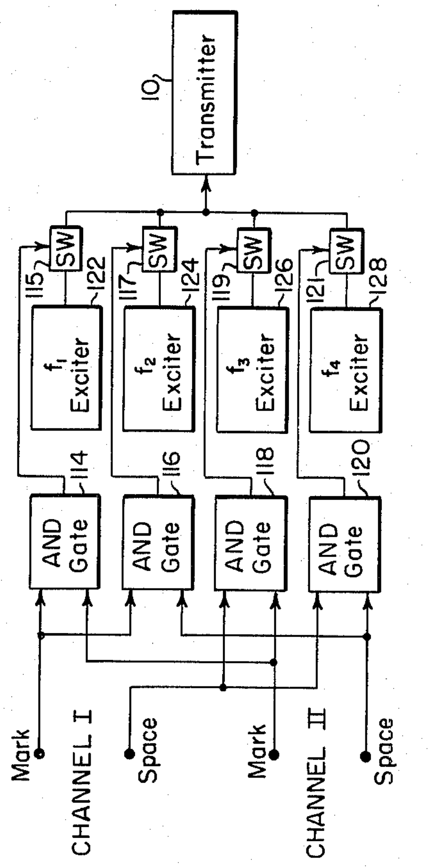
FIG. 6
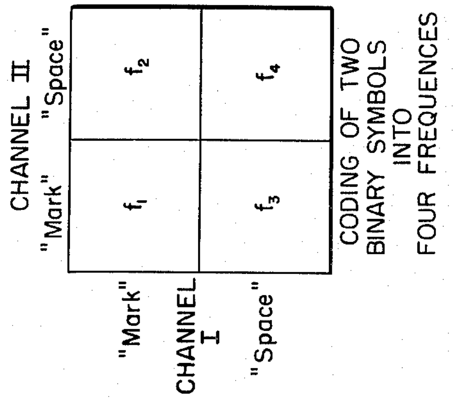
FIG. 5
INVENTORS
ROBERT W. SPROUL
MARTIN B. BRILLIANT
MARTIN OXMAN
ROBERT ALTER
By Kenway, Jenney, Witter & Hildreth
ATTYS.

Oct. 26, 1965 R. W. SPROUL ETAL 3,214,691

FREQUENCY DIVERSITY COMMUNICATIONS SYSTEM

Filed May 13, 1960 5 Sheets-Sheet 4

INVENTORS
ROBERT W. SPROUL
MARTIN B. BRILLIANT
MARTIN OXMAN
ROBERT ALTER

By Kenway Jenney Witter & Hildreth ATTY'S

FREQUENCY DIVERSITY COMMUNICATIONS SYSTEM

Filed May 13, 1960 5 Sheets-Sheet 5

INVENTORS
ROBERT W. SPROUL
MARTIN B. BRILLIANT
MARTIN OXMAN
ROBERT ALTER

By Kenway, Jenney, Witter & Hildreth
ATTYS.

United States Patent Office 3,214,691
Patented Oct. 26, 1965

3,214,691

FREQUENCY DIVERSITY COMMUNICATIONS SYSTEM

Robert W. Sproul, Lexington, Martin B. Brilliant, Boston, Martin H. Oxman, Malden, and Robert Alter, Reading, Mass., assignors to National Company, Inc., Malden, Mass., a corporation of Massachusetts Filed May 13, 1960, Ser. No. 28,986
33 Claims. (Cl. 325—30)

Figure 1:
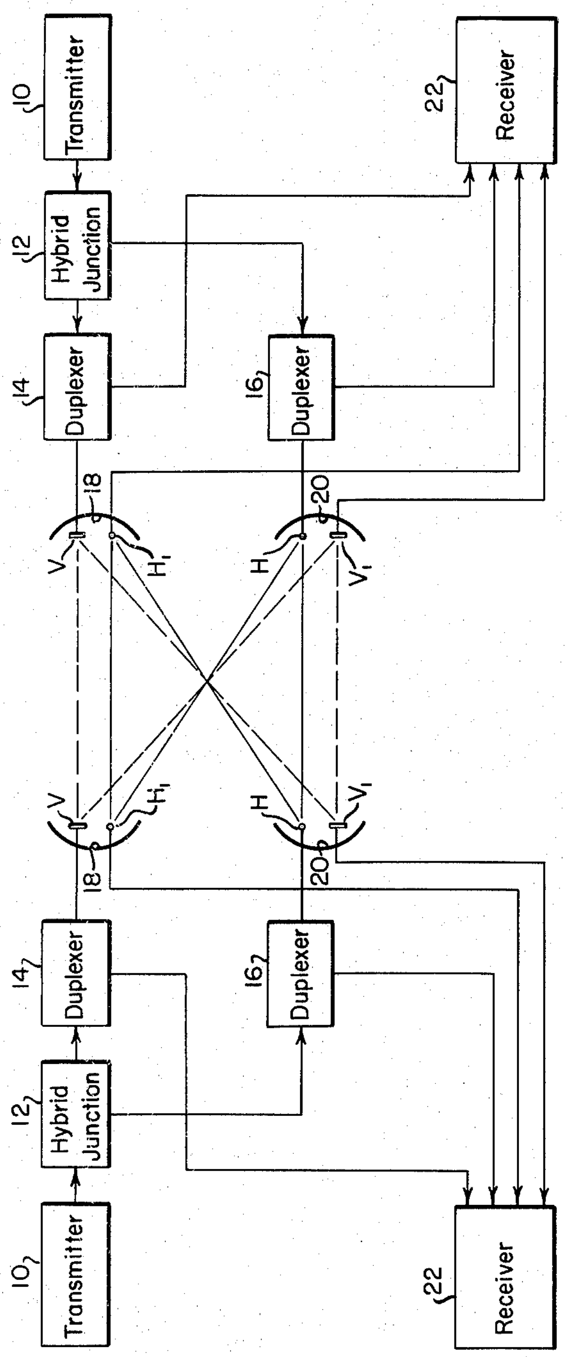

Our invention relates to a communications receiver capable of improved reception of signals modulated by frequency shift keying methods. The receiver is designed for improved reception of high frequency signals transmitted by tropospheric scattering techniques in which the signals are redirected toward the receiving antennas by multiple discontinuities in the upper atmosphere. The receiver of our invention overcomes many of the problems resulting from signal fading as the various signal paths increase and decrease in transmission efficiency.

Our invention also relates to a novel coding arrangement which provides a communications system, using our receiver, having increased information-handling capacity with significant saving in equipment.

Prior to the advent of tropospheric scatter communications, it was thought that the maximum range for wireless communications at frequencies from several hundred megacycles on up into the microwave region depended on the line-of-sight distance between the transmitter and receiver as limited by the earth's curvature and intervening mountainous terrain. However, it has been found that various features of the terrain and the atmosphere above it combine to support communications at these frequencies far beyond the line-of-sight limitation. For example, sharp obstructions such as mountain peaks and ridges cause diffraction of the transmitted waves, bending them to follow along the earth's surface. Of even greater importance, changes in the refractive index of the atmosphere, caused by temperature inversions and other phenomena, turn waves back toward the earth at distances far from the transmitter; various discontinuities in the propagation characteristics of the atmosphere, caused, for example, by the passage of meteorites through it, reflect or refract transmitted energy toward the earth.

Some of this redirected energy is channelled toward the receiver, which may be located hundreds of miles from the transmitter. The portion of the transmitted energy reaching the receiver is quite small; however, the use of high power transmitters, sensitive receivers and highly directional antennas has resulted in serviceable communications by scatter-supported propagation. By opening up the higher frequencies to efficient long range communications, tropospheric scatter systems may eventually support a major portion of long distance radio channels, which are presently crowded into a relatively narrow range below 30 megacycles.

The various atmospheric phenomena which cause tropospheric scatter undergo continuous change in size, degree and position. Therefore, the strengths of the signals redirected from the troposphere vary significantly over a period of time, causing considerable fading at the receiver. To alleviate the fading problem, the receiver is provided with a multiple path diversity system including two or more directional antennas spaced some distance apart. Consequently, the antennas receive signals travelling over somewhat different routes from the transmitter. Thus, although the signal received by one or more of the antennas may be close to or below the noise level, it is probable that one of the other antennas will at the same time be receiving a relatively strong signal. The output signals of the various antennas are combined in the receiver by a weighting system which accords greater weight to antenna signals with higher signal-to-noise ratios. Since the latter signals are more likely to indicate the true signal being transmitted, the over-all reliability of the receiver is greatly improved by this method of combining the various signals. Even then, however, the reliability leaves much to be desired.

Accordingly, the principal object of our invention is to provide a communications receiver which provides greater reliability in the reception of multiple path signals than heretofore obtainable.

Another object of our invention is to provide a receiver of the above character adapted for the reception of frequency-shift keyed signals and capable of handling high information rates, e.g., 100,000 bits of coded information per second per channel, with improved reliability. As used herein, a "bit" is an elemental item of information indicating which of two values a quantity may have.

Another object of the invention is to provide a receiver of the above type adapted for use in a tropospheric scatter communications system.

Still another object of our invention is to provide a multiple path communications system capable of a high degree of reliability.

A further object is to provide a tropospheric scatter communications system capable of a high information rate and yet conservative of equipment and requiring a minimum channel width.

Other objects of the invention will in part be obvious and will in part appear hereinafter.

The invention accordingly comprises the features of construction, combinations of element, and arrangements of parts which will be exemplified in the constructions hereinafter set forth, and the scope of the invention will be indicated in the claims.

Figure 9:
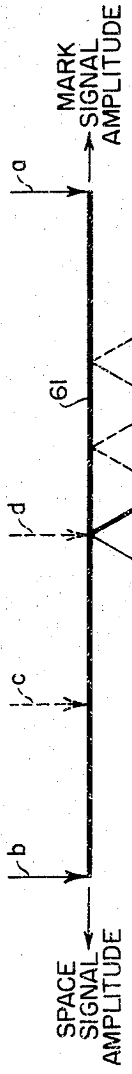
Figure 2:
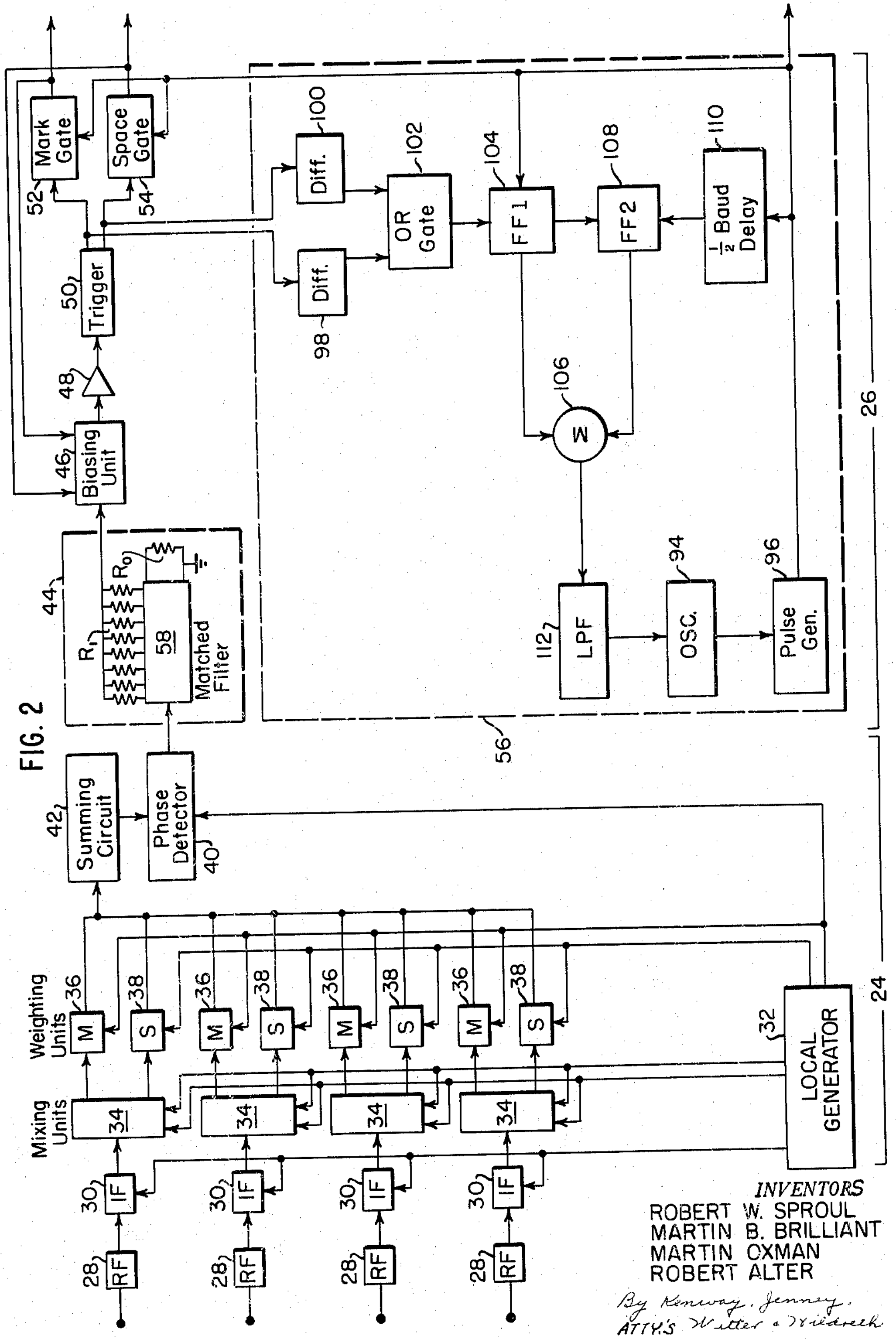
Figure 7:
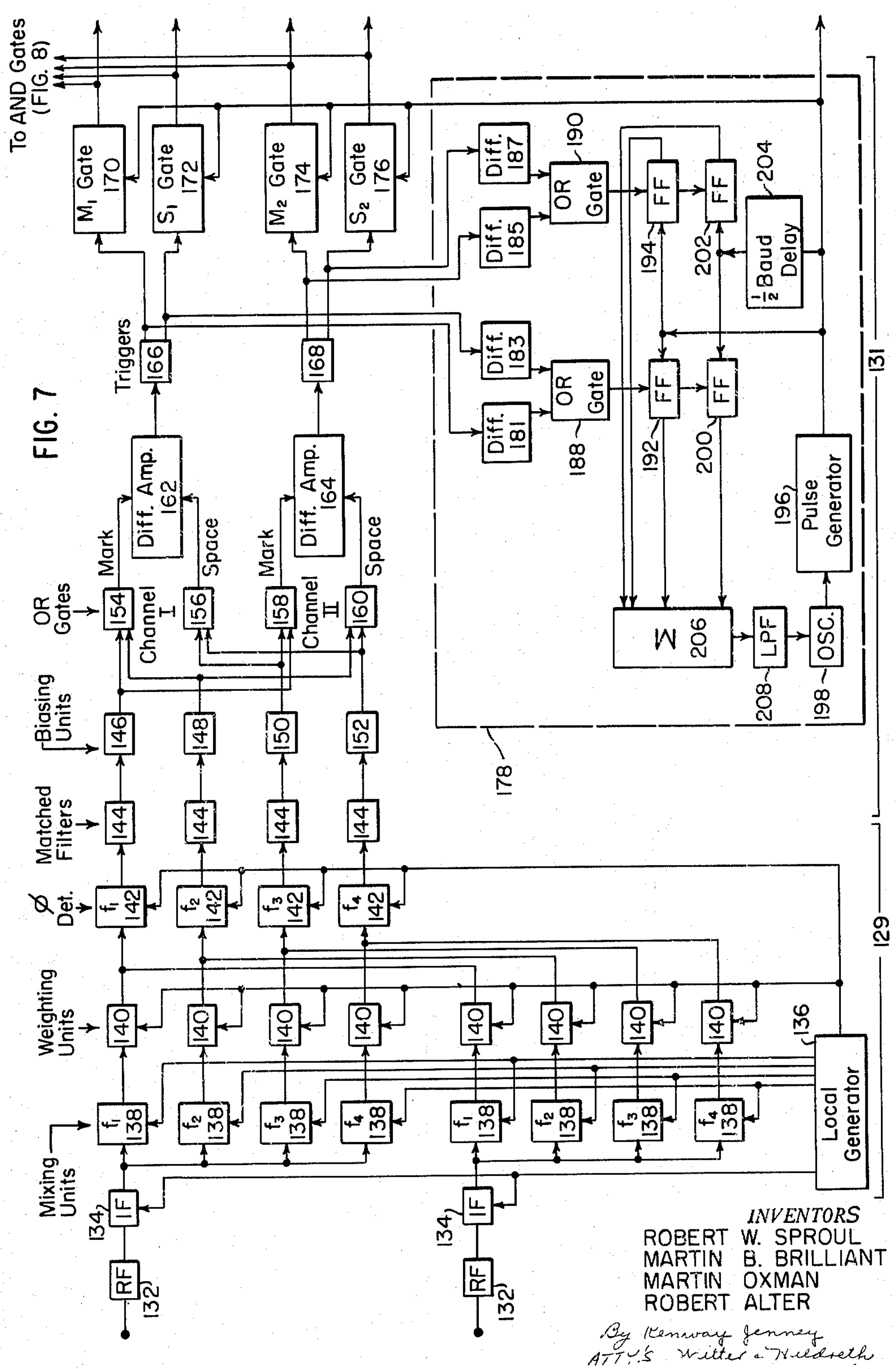
Figure 8:
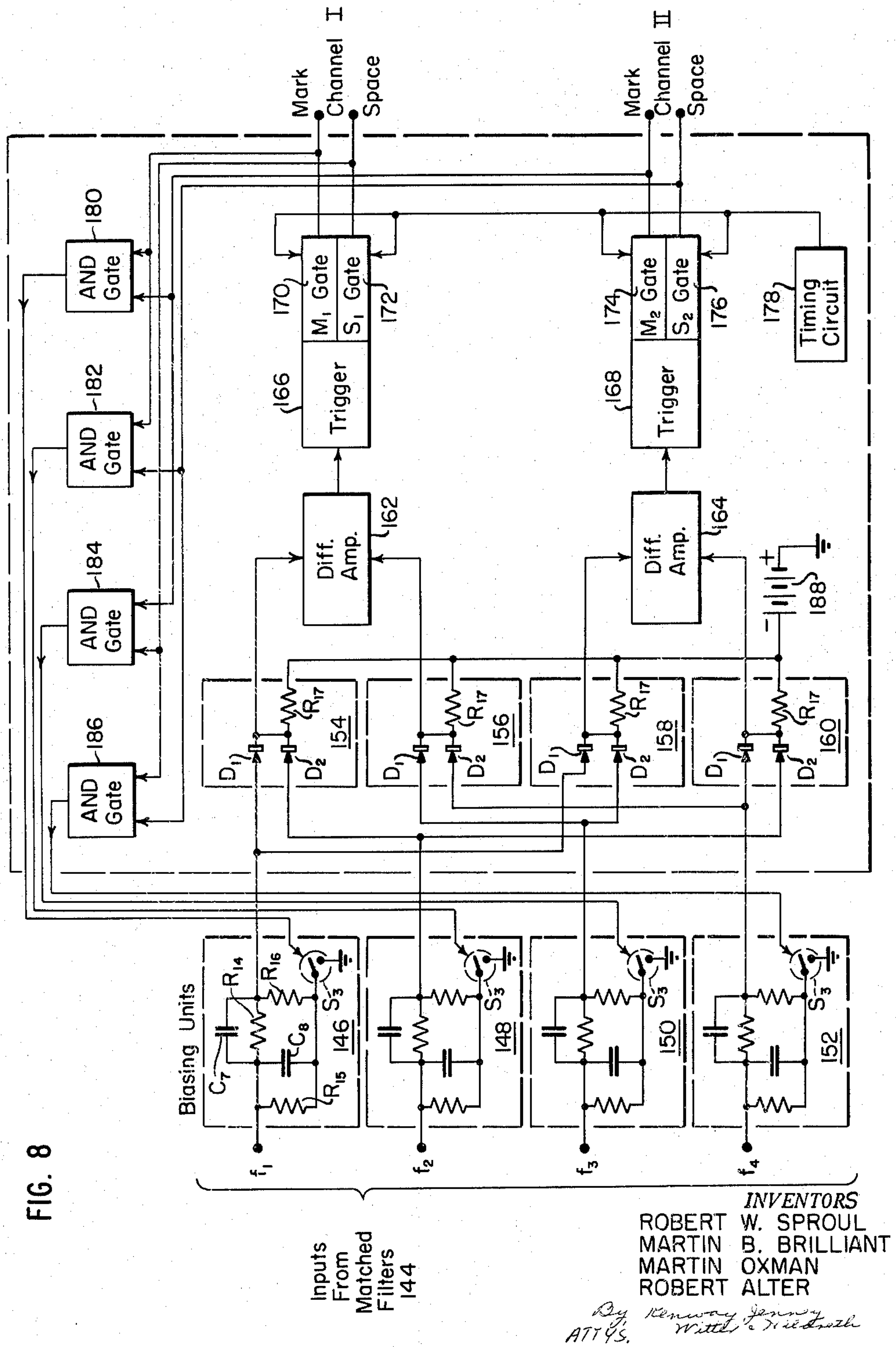

For a fuller understanding of the nature and objects of the invention, reference should be had to the following detailed description taken in connection with the accompanying drawings, in which:

FIGURE 1 is a diagram of a tropospheric scatter communications system operating in a single radio frequency channel, FIGURE 2 is a schematic diagram of a single-channel receiver incorporating the principles of our invention, which may be used in the communications system of FIGURE 1, FIGURE 3 is a detailed schematic diagram of the automatic biasing circuit incorporated in the receiver of FIGURE 2, FIGURE 4 is a detailed schematic diagram of a switch used in the biasing circuit of FIGURE 3, FIGURE 5 is a table showing a code used in combining two information channels in a quaternary coded frequency shift system, FIGURE 6 is a schematic diagram of a unit adapted to transmit quaternary coded frequency shift signals, FIGURE 7 is a schematic diagram of a receiver used in the two-channel system of FIGURE 5, FIGURE 8 is a detailed schematic diagram of biasing circuits which may be incorporated in the receiver of FIGURE 7, and FIGURE 9 is a diagram graphically illustrating the decision-making system incorporated in our receiver.

I. GENERAL DESCRIPTION OF THE INVENTION

In general, our communications system combines a frequency shift mode of transmission with the above-described multiple path diversity techniques and a frequency diversity arrangement. As is well known in the communications field, a frequency shift system employs a transmitter whose frequency is generally shifted between two values, a "mark" frequency and a "space" frequency; the two frequencies enable transmission of information translated into a binary code. One such code is the well-known Baudot code used in teletype systems for transmission of alphabetical and numerical symbols. The binary system is used in most digital data processing equipments, and therefore frequency shift transmission is inherently adapted for transmission of data between devices of this type. Furthermore, binary coding may be used for analog quantities as well, and by this means even speech may be transmitted by a frequency shift system, provided that the system bandwidth is sufficient. Our receiver is provided with novel decision circuits which not only compare the relative amplitudes of the mark- and space-indicating signals appearing at the receiving antennas, as in prior frequency shift systems, but also compare them with their expected or probable amplitudes.

Tropospheric scatter propagation is accompanied by selective fading. Generally, each receiving antenna intercepts energy travelling over a number of different paths, and there is interference between signals taking different routes. The interference causes an increase or decrease in amplitude of the resultant signal, depending on the wavelength involved. The resultant phase also depends on wavelength.

In a sufficiently narrow band of frequencies, the changes in amplitude and phase are fairly coherent, and transmission within this bandwidth may be effected without intolerable distortion. When the frequency spread of the transmitted signal is increased beyond this limit, coherence in fading is lost between the more widely spaced frequency components, and therefore the relative values of amplitude and phase at the receiver are appreciably different from the transmitted values. This represents excessive distortion, and therefore the propagation medium itself limits the system bandwidth. At a radio frequency of 2000 megacycles, this bandwidth has been found to be on the order of 100 kilocycles.

We have made use of the lack of coherent fading at widely spaced frequencies to provide an additional degree of diversity in the system. The mark and space frequencies are spaced far enough apart, approximately three megacycles at a frequency of 2000 megacycles, to provide a complete lack of coherence in fading. Thus, separate information exists at the two frequencies to aid in determining which of them has actually been transmitted. In other words, an added degree of diversity has been added, thereby increasing materially the probability that at any given time a transmitted signal will be received and recognized.

From previously received signals, the receiver separately stores mark and space amplitude information, and from these data it determines the most probable amplitudes for such signals, should they be received during the next interval or baud of transmission. Each baud contains one bit of transmitted information. The incoming signals at the mark and space frequencies are combined to provide a net input signal, and the stored mark and space information is combined to set a decision level. If the net input signal is above this level, the receiver will register one character, e.g., mark, and if the signal is below this level, the receiver will register the other character, e.g., space.

Thus, if there is noise on the mark or space frequency or differences in transmitter-receiver transit time, signals at both the mark and space frequencies may be received. Combination of these signals may provide a net input signal having a polarity nominally indicating a mark. However, the memory circuits may indicate that, because of fading at the space frequency, the expected amplitude of a mark signal is much greater than that of a space signal. The decision level will be shifted in the direction of the mark polarity and, in order for the receiver to register a mark, the net input signal must exceed this level. In this manner, the receiver makes use of two separate, independent items of stored information in determining which signal was actually transmitted: the probable amplitude of a mark signal and the probable amplitude of a space signal, and it compares them with the actual amplitudes at the mark and space frequencies.

We have described below two embodiments of our receiver, one for operation in a single radio frequency channel, i.e., one mark and one space frequency, and the other for multiple-channel duty. The latter receiver is incorporated in a novel communications system which overcomes many of the difficulties previously encountered in multi-channel systems.

In FIGURE 1 we have illustrated a tropospheric scatter system comprising two stations arranged for communication with each other. Each station includes a transmitter 10 connected to a hybrid junction 12 which divides the transmitter output equally between a pair of duplexers 14 and 16. The duplexers in turn pass the transmitter outputs to vertically polarized antennas V and horizontally polarized antennas H mounted in parabolic reflectors 18 and 20, respectively. The reflectors 18 and 20 also support antennas $H_1$ and $V_1$ connected to receivers 22, and the duplexers 14 and 16 pass incoming signals from the antennas V and H to the receivers as well. Thus, each receiver obtains input signals from two vertical and two horizontal antennas.

The two stations of FIGURE 1 are located beyond the horizon from each other, and line-of-sight transmission between them is therefore impossible. At each station, the reflectors 18 and 20 are spaced apart to direct the transmitted energy along somewhat different paths through the troposphere. Various scatter phenomena then redirect the signals toward the antennas at the other station. Usable transmission will generally occur between similarly polarized antennas, as indicated in FIGURE 1.

The receivers 22 contain weighting circuits which combine the signals from the various antennas in accordance with the respective signal-to-noise ratios at the antennas. Thus, if the signal received by a V antenna undergoes a deep fade, the weighting circuit connected to the antenna will decrease the proportion of the output from the V antenna combined with the outputs from the other antennas. Statistically speaking, it is fairly probable that at least one of the antennas will be receiving a usable signal, and therefore the over-all reliability of the system is much greater than the reliability of the signal at any given antenna. As pointed out above, we have incorporated binary decision circuits which greatly increase the reliability of the receivers.

II. SINGLE CHANNEL RECEIVER

As shown in FIGURE 2, a receiver embodying the principles of our invention includes an input and detecting section 24 and a decision section 26.

(*A*) *Input and detecting section*

The section 24, which is preferably arranged for coherent detection of incoming signals, is provided with radio frequency amplifiers 28 whose individual inputs are derived from the respective antennas. The output of each amplifier 28 forms one input to an intermediate frequency unit 30. Each unit 30 includes a mixer followed by an amplifier, with the mixer supplied with energy from a local generator 32. As explained below, the generator 32 has a number of outputs supplying energy at various frequencies.

The intermediate frequency units 30 are followed by mixing units 34. Each of the mixing units includes a pair of mixers deriving one input from the preceding intermediate frequency unit 30 and another input from the local generator 32. The frequencies supplied by the generator to the two mixers are spaced apart by the same interval as the spread between the mark and space frequencies, and therefore the outputs from all the mixers are at the same frequency. For example, the IF frequency of a mark signal may be 63 megacycles and that of a space signal 60 megacycles. In one mixer in each unit 34, the IF signal is mixed with a 58 megacycle local signal, and in the other mixer it is combined with a 55 megacycle signal. The output signals of the mixers are passed through respective 5 megacycle filters. One filter will then have a 5 megacycle output (63–58) whenever a mark signal is received, and the other will have a similar output (60–55) whenever a space signal is received.

The mark and space outputs from each mixer unit 34 are connected to separate weighting units 36 and 38, respectively, which have gains proportional to the short term average signal-to-noise ratios in their inputs. The units 36 and 38 may employ any weighting system which provides an output signal whose magnitude is substantially proportional to the signal-to-noise ratio of the input signal. Typically, the weighting units include mixers which heterodyne the signals supplied to the units 36 and 38 with signals from another pair of outputs of the generator 32. The generator signals applied to the mark units 36 are of the same frequency as those applied to the space units 38 but of opposite phase. Hence, the output frequency is the same for all the weighting units, but the phase of the mark unit outputs is opposite to that of the space unit outputs. Because of the weighting, the amplitudes of the output signals of the weighting units are approximately proportional to the squares of the amplitudes of the received signals at the respective radio frequencies.

The outputs of the weighting units are combined in a summing circuit 42 and fed to one input of a phase detector 40. The other input is supplied from an output of the generator 32 having the same frequency as the outputs of the units 36 and 38. The phase of the output of the summing circuit 42 depends on whether signals at the mark or space frequencies predominate, on the whole, at the input to the receiver. The magnitude of the summing circuit output voltage is proportional to the difference between the combined mark amplitudes and space amplitudes after weighting. The output of the phase detector 40 has a polarity which depends on the phase of the output of the summing circuit 42 and a voltage level which depends on the magnitude of the summing circuit output. Accordingly, the output of the detector 40 reflects by its polarity the presence of a predominantly mark or space signal at the receiver input and, by its level, the net magnitude of the signal.

(*B*) *Decision section*

The output of the phase detector 40 is passed through a matched filter 44 to a biasing unit 46. The biasing unit alters the level of the signal in a manner described below to compensate for the expected or probable amplitudes of mark and space signals. The output of the unit 46 may be amplified by an amplifier 48 before being fed to a trigger 50. The trigger is a bistable device whose state depends on whether its input voltage is above or below a given level, e.g., zero. By way of example, if the voltage is above zero, i.e., positive, the reception of a mark is indicated, and the trigger 50 will assume one state; if the trigger input voltage is below that level, i.e., negative, indicating a space, the trigger will assume the other state. According to the state of the trigger 50, a mark gate 52 or a space gate 54 will open to pass a timing pulse from a timing circuit 56. One timing pulse is emitted for each baud (the interval during which one bit of information is transmitted), and therefore the outputs of the gates 52 and 54 represent the signal received by the receiver 22.

(1) MATCHED FILTER

The matched filter 44 consists of a delay line 58 terminated in its characteristic impedance by a resistor $R_0$ and tapped at intervals along its length by resistors R1. In actual construction, the delay line, which provides a total delay from one end to the other of one baud (10 microseconds for a 100 kilobit per second information rate), may be fabricated from lumped parameter elements, i.e., inductors and capacitors, in a well-known manner. The resistors R1 all have the same resistance, which should be considerably greater than the characteristic impedance of the line 58 to minimize loading effects. These resistors are connected together to form a summing circuit so that the input voltage to the biasing unit is proportional to the sum of the voltages at the taps on the delay line.

Thus, as each bit of information enters the delay line 58, the leading edge of the signal, i.e., the part transmitted first, moves along the line until it reaches the terminating resistor $R_0$. At this time, the trailing edge or last part of the bit is just entering the delay line. The output of the summing circuit which includes the resistors R1 is then indicative of the average value of the input to the receiver 22 during reception of this bit of information. In other words, the decision circuit is then looking at the entire bit of information at one time. This is the best time to make a decision as to whether the bit represents a mark or a space, since at no other time is so much information relating to this bit available for consideration. Accordingly, the timing circuit 56 is synchronized to emit pulses at this moment, and the outputs of the gates 52 and 54 indicate the state of the trigger 50 when the entire bit is in the delay line 58.

The bit continues to move to the right (FIGURE 2) to be dissipated in the resistor $R_0$, and as it moves along the delay line 58, the leading edge of the next bit follows along behind. As soon as the next bit is completely contained in the delay line, the next pulse from the circuit 56 is applied to the gates 52 and 54 to indicate the information (mark or space) contained in the bit.

(2) BIASING UNIT

The biasing unit 46 is illustrated in detail in FIGURE 3. It includes a biasing capacitor C1 and storage capacitors C2 and C3. The latter capacitors store the amplitudes of the last previous mark and space signals received by the receiver. The capacitors C2 and C3 are paralleled by resistors R2 and R3. They are connected to the capacitor C1 by a pair of equal summing resistors R4 and R5. A pair of normally open switches S1 and S2, respectively, are connected between the capacitors C2 and C3 and ground. The switches are closed by pulses from the mark and space gates 52 and 54 (FIGURES 2 and 3).

The capacitors C2 and C3 store the amplitudes of the most recent mark and space signals, respectively, appearing at the output of the matched filter 44 (FIGURE 2). The method by which they acquire their stored information is as follows. If a mark has been registered by the receiver, the pulse from the timing circuit 56 passed by the mark gate 52 (FIGURE 2) closes the switch S1 (FIGURE 3). This places the capacitor C2 across the output of the matched filter 44 for the duration of the pulse. During the short interval in which the switch S1 is closed, the capacitor is connected across the output terminals of the filter 44 and thus acquires the output voltage of the filter, i.e., the amplitude of the bit of information contained in the filter. The capacitor C2 discharges through the resistor R2 and also through the resistors R3, R4 and R5. The resistances of these resistors should be great enough to provide a discharge time for the capacitor which is longer than the maximum interval generally encountered between mark signals. At a 100 kilobit per second information rate, both mark and space signals will generally be transmitted in any 0.0001 sec. interval, and therefore this requirement is easily met with conventional resistors and capacitors.

The capacitor C3 is charged in the same manner as the capacitor C2, though normally with opposite polarity. In this case, each time the receiver decides that a space has been received, the space gate 54 passes a pulse which closes the switch S2.

The voltages across the capacitors C2 and C3 are summed at the junction of resistors R4 and R5, and the voltage across the capacitor C1 is an "average" value of half the algebraic sum of the individual voltages over a perior of time roughly equal to the time constant of this capacitor and its associated resistors R2–R5. The voltage across the capacitor C1 may be termed the "decision level," since, as pointed out below, this voltage is the demarcation point between mark and space signals as registered by the receiver.

Since the capacitor C1 is constantly discharging through the resistors R2–R5, the contribution of later signals to its total charge is greater than that of earlier received signals. Therefore, the average will be weighted, giving the most weight to the most recent mark and space signals. The time constant should be short enough for the voltage across the capacitor C1 to follow the fading of the receiver input signals. It should be long enough for the capacitor to store information from several mark and space signals and therefore minimize the effects of any bit of information. In this manner, the circuit largely eliminates the effect of sudden spurious changes in amplitude resulting from short term factors such as noise. The voltage across the capacitor C1 then reflects the most probable mark and space amplitudes in setting the lever of the output voltage at which the decision section 26 (FIGURE 2) will switch between mark and space outputs from the receiver.

(3) DECISION-MAKING

With reference to FIGURE 3, operation of the biasing unit 46 in the decision-making process will best be understood by considering first the case where over a period of time the levels of mark and space signals at the input to the unit have been the same. That is, the average net strengths of the respective signals, as received by the receiver and combined by the summing circuit 42 (FIGURE 2), have been equal. It will be apparent that in this case the expected or most probable levels of the next incoming mark and space signals are also equal. The voltages on the capacitors C2 and C3 will have been of opposite polarity, and the weighted average of their magnitudes will have been equal. Thus, the voltage across the capacitor C1, which is half the sum of these averages, will be zero. Accordingly, the output of the filter 44 will pass through the capacitor C1 on its way to the amplifier 48 and trigger 50 without any change in its level.

The trigger 50 is thus set to switch between its two states corresponding to mark and space signals at a decision level of zero volts with respect to ground. With the mark and space polarities assumed above, the trigger will be in the mark state if the voltage at its input is positive; if the voltage is negative, it will be in the space state. Accordingly, under the above condition, with zero bias voltage across the capacitor C1, the receiver will register a mark if the voltage at the junction of the summing resistors R1 of the filter 44 (FIGURE 2) is at all positive when the gates 52 and 54 are pulsed; if the voltage at the output of the filter 44 is negative, a space will be indicated.

On the other hand, if the expected amplitude of a mark signal is greater than that of a space signal, that is, if over a period of time the mark amplitude has generally been greater than the space amplitude, the weighted average voltage across the capacitor C2 will be greater than the average voltage across the capacitor C3. The voltage at the output terminal 62, midway between the two levels, will therefore be negative with respect to the terminal 60. The voltage between the terminals 60 and 62 is in series with the output voltage of the filter 44, and consequently, it subtracts from this voltage. Positive voltages from the filter are shifted downwardly, and negative voltages are made more negative. More specifically, all positive voltages less than the bias of the capacitor C1 are shifted into the negative region and thereby cause the trigger 50 to shift for indication of a space by the receiver. In other words, the decision level has been shifted to a positive voltage (equal to the voltage across the capacitor C1), and the receiver will indicate a space if the output voltage of the phase detector is less positive than the decision level.

This is as it should be. If the receiver picks up signals at both marks and space frequencies because of noise, transmission paths of different lengths or other anomalous phenomena, and the mark signal is stronger than the space signal, it is generally likely that a mark signal was transmitted if the expected levels of mark and space signals are the same. However, if there has been fading at the space frequency so that the expected level of a space signal has been reduced, equality of the magnitudes at the two signal frequencies means that it is more likely that a space signal was transmitted. A preponderance of strengths at the mark frequency will indicate a mark signal only if the signal strength at the mark frequency is greater than the expected amplitude of a space signal plus half the difference in the expected mark and space amplitudes, a level which compensates for the disparity in the expected or probable amplitudes at the two frequencies.

For example, consider the extreme case where the probable signal amplitude at the space frequency is zero. That is, the signal strength at the space frequency has faded to the point where there is practically no likelihood of reception of a space signal even if one is transmitted. In such case, all the information that the receiver can act on is at the mark frequency. Obviously, if the mere presence of a signal at this frequency would cause registration of a mark, the receiver would be in error about half the time, since on the average, an equal number of mark and space signals are transmitted over any significant length of time. The proper decision level in this case is one half the expected mark amplitude, with signals at the mark frequency above this level indicating marks, and signals below this level indicating spaces.

This is exactly the way the receiver described herein will respond to a deep fade at the space frequency. The capacitor C3 in FIGURE 3 will have no voltage across it, and therefore the voltage at the junction of resistors R4 and R5 will be half the voltage across the mark storage capacitor C2. Half the expected mark level will therefore be subtracted from the voltage at the output of the filter 44.

FIGURE 9 graphically illustrates the manner in which the biasing unit 46 aids in the decision-making process. The detected amplitudes of received signals are given by their distances along a line 61 from the origin. Space signals appear on the left of the origin (negative) and mark signals on the right (positive). Ideally, the mark and space signals have equal amplitudes, and the arrows *a* and *b* representing these amplitudes impinge on the line 61 at equal distances from the origin. Under this condition, the line is pivoted on a fulcrum 63 disposed at the origin. Accordingly, whenever the detected amplitude at the mark frequency is greater than that at the space frequency, there will be a net clockwise movement on the line 61, corresponding to transmission of a mark, and this will be indicated by the receiver.

If the average amplitude of a space signal decreases by one half to the point indicated by the arrow *c*, the fulcrum 63, whose position corresponds to the decision level of the receiver, will shift to the position 63*a*, halfway between the arrows *a* and *c*. If the average space amplitude decreases to 0 (the arrow *d*), the fulcrum will attain the position 63*b*, halfway between the origin and the expected mark amplitude.

It will be appreciated that, when the signal strength at the space frequency predominates, the decision level will shift into the negative region. That is, the potential at the terminal 60 of FIGURE 3 will become negative with respect to the terminal 62. The bias voltage of the capacitor C1 will thus add to signals at the mark frequency (positive output voltage from the filter 44 of FIGURE 2) and subtract from signals at the space frequency (negative voltage from the filter 44).

As previously discussed in connection with FIGURE 3, the various time constants of the biasing unit 46 should be short enough to enable the biasing voltage across the capacitor C1 to follow changes in strength of the received signals at the mark and space frequencies. Also, as pointed out above, the biasing voltage should represent the mark and space signal strengths over a considerable number of bauds. Therefore, the information rate of the system, i.e., the reciprocal of the baud length, should be substantially greater than the fading rate. Experience has indicated that fading rates of up to 100 cycles per second can be expected with tropospheric scatter communications. Hence, with an information rate of 100 kilobits per second this requirement is easily fulfilled.

As pointed out above, the mark and space frequencies are centered far enough apart to insure absence of correlation of propagation conditions at the two frequencies. Fading at one frequency will then be independent of fading at the other frequency. Thus, the signal strengths at the two frequencies can both contribute to the information used by the receiver in determining whether a mark or a space has been transmitted. If the frequencies are too close together, there will be some degree of correlation in their fading. To the extent of such correlation, fading at both frequencies will tend to be simultaneous, so that, when information is lost on one frequency due to fading, the probability that it will be available on the other frequency is reduced. With adequate separation between the frequencies, independent fading will occur on the two frequencies, resulting in a greater quantity of independent data for use in the decision-making process.

(4) BIASING UNIT CONTROL SWITCHES

In FIGURE 4 we have illustrated a specific circuit for the switch S1 of FIGURE 3. The switch S2 may be similarly constructed. The circuit of FIGURE 4 includes a cathode follower stage 64 and a plate-loaded stage 66 which drive a diode switch 68. The stage 64 includes a triode 70 whose grid *70a* is coupled by means of a capacitor C4 and a resistor R6 to the output of the mark gate 52 or the space gate 54 (FIGURES 2 and 3). The plate *70b* of the triode 70 is directly connected to a positive voltage source, as indicated by the battery 71, and the cathode 70 is connected to a negative source, illustratively a battery 73, through a resistor R7. The grid 70 is returned to the battery 73 through a resistor R8. The output of the stage 64 at the cathode *70c* is directly connected to the anodes of a pair of oppositely oriented diodes 72 and 74 in the switch 68.

The stage 66 includes a triode 76 whose grid *76a* is coupled to the cathode *70c* by a capacitor C5 and resistor R9. The grid *76a* is connected to the battery 73 by a resistor R10. A plate load resistor R11 is connected to the plate *76b*, and the cathode *76c* is connected to the battery 73 by a resistor R12. A resistor R13 and capacitor C6 are connected in parallel between the cathode *76c* and ground. The output of the stage 66, at the plate *76b*, is directly connected to the cathodes of a pair of oppositely oriented diodes 78 and 80 in parallel with the diodes 72 and 74. A terminal 82 of the switch 68 is connected to the capacitor C2 of FIGURE 3.

Still referring to FIGURE 4, in the absence of an input signal at the first stage 64, the grid *70a* will be at the potential of battery 73 (−150 volts), and the potential of the cathode will be approximately the same, thereby applying a high reverse bias to the diodes 72 and 74 and preventing conduction through them. The grid *76a* of the second stage 66 will also be at the negative potential of battery 73, thereby cutting off conduction of the tube 76. The plate *76b* is therefore at the positive potential of battery 71, which reverse biases the diodes 78 and 80. With all the diodes reverse-biased, the switch 68 is open and the capacitor C2 is isolated from ground.

If a positive pulse from one of the gates 52 and 54 arrives at the input terminal 84 of the switch circuit, the grid *70a* will rise to a slightly positive potential for the duration of the pulse, and with the cathode *70c* following the grid, a positive voltage will be applied at the junction of the diodes 72 and 74. The positive pulse will also be passed to the grid *76a*, thereby decreasing the internal resistance of the tube 76 and lowering the voltage at the plate *76b* to a slightly negative value. The junction of the diodes 78 and 80 is therefore also slightly negative. Thus, the diodes are all biased in the forward direction to provide a very low resistance to ground. Assuming equality of the negative and positive potentials applied on opposite junctions of the switch 68 and equality of the forward resistances of the diodes 72 and 78, the terminal 82 will have a zero or ground potential. With low resistances in the diodes 72 and 78 and low impedances in the voltage sources maintaining the forward biases, the terminal 82 is therefore essentially shorted to ground.

The diodes 74 and 80 serve as clamps which maintain the forward voltage supplied to the switch 68 from the stages 64 and 66 at the proper values to keep the terminal 82 at ground potential during switch conduction.

(5) TRIGGER

The trigger 50 may take the form of any conventional circuit adapted to distinguish between voltages below and above a given level. For example, a so-called "Schmitt trigger" may be used to accomplish this function. A pair of vacuum tubes are cascaded with a common cathode resistor and the grid voltage of the second tube tapped down on a potentiometer connected to the plate of the first tube. The grids of both the tubes are returned to ground by way of a high negative potential source. Above the switching level, the first tube conducts and maintains the second tube in a cut off condition. When the voltage at the grid of the first tube decreases below the switching level, its plate voltage goes up, and its cathode voltage goes down. The resulting effects on the grid and cathode voltages of the second tube permit it to conduct, and the current drawn by the second tube through the common cathode resistor cuts off the first tube. The plate voltages of the two tubes operate the mark and space gates 52 and 54.

A "Schmitt trigger" may also be constructed with transistors instead of vacuum tubes. A circuit of this type is described in Department of the Army Technical Manual TM 11–690, "Application of Transistors," p. 208 et seq.

(6) TIMING CIRCUIT

As indicated above, the pulses from the timing circuit 56 of FIGURE 2 should occur at the end of each baud to register the state of the trigger 50 at a time when it reflects the greatest amount of information concerning the presence of a mark or space signal in the baud. The manner in which the timing circuit adjusts the timing of the pulses it emits so as to maintain proper synchronization with the incoming signals will now be described.

As seen in FIGURE 2, the circuit 56 includes an oscillator 94 which drives a pulse generator 96. The pulses from the generator 96 are the timing pulses emitted by the circuit 56. The oscillator 94 includes a reactance tube or other frequency-adjusting element (not shown) controlled by a signal developed from the incoming signal itself.

More specifically, the outputs of the trigger 50 are connected to differentiating circuits 98 and 100 whose pulse outputs are passed through an OR gate 102. The gate 102 passes all input pulses of a given polarity, and for purposes of illustration, they shall be considered positive pulses. Each time the trigger 50 shifts from one state to the other, signifying a change from a mark to a space or vice versa, the voltage at one of its outputs will rise. This voltage rise will be converted to a positive pulse by the differentiating circuit 98 or 100 connected to that output, and the pulse will be passed by the gate 102.

The pulses from the gate 102 are applied to one input of a bistable device or flip-flop 104 whose states may be considered "on" and "off." The "on" input receives the OR gate pulses, which shift the flip-flop to the "on" state. Pulses from the generator 96 applied to an "off" input shift it to the "off" state. One output from the flip-flop 104 supplies a constant positive voltage to a summing circuit 106 whenever the flip-flop is on. Another output from the flip-flop 104 supplies a positive pulse to the "on" input of a second flip-flop 108 each time the flip-flop 104 switches from the "on" state to the "off" state. The "off" input of the flip-flop 108 is pulsed at one-baud intervals by the generator 96 by way of a one half-baud delay circuit 110. An output from the flip-flop 108 supplies a constant negative voltage to the summing circuit 106 whenever this flip-flop is on. The output of the summing circuit 106 is passed through a low pass filter 112 to control the frequency of the oscillator 94.

The operation of the timing circuit of FIGURE 2 is as follows. On the average, the trigger 50 will shift from one state to the other midway in each baud. This can be seen from the fact that at this time the matched filter 44 will contain one half the signal transmitted during one baud and one half the signal transmitted during the next baud. Assuming that one of these bauds contains a mark (positive) and the other a space (negative), the output voltage of the filter 44 will at this point, under ideal conditions, shift through the level necessary to cause the trigger 50 to shift its state. Noise may cause variations in the time of this shift, but this effect averages out to zero over a larger number of bauds.

Therefore, the flip-flop 104, which is switched on by shifts of the trigger 50 and off by pulses from the generator 96, has an average on time of one half baud if the timing of the end-of-baud pulses from the generator is correct. If the timing is incorrect due to drift of the oscillator 94 or the timing device at the transmitter, the on time will be shorter or larger than one half baud, depending on whether the timing pulses are emitted too soon or too late. It should be emphasized that the frequencies of the oscillator 94 and its counterpart in the transmitter may be almost exactly the same, but the timing error, which accumulates with each baud, may take on significant proportions just the same. This cumulative error is the departure of the "on" time of the flip-flop 104 from its nominal one half-baud value.

On the other hand, the "on" time of the flip-flop 108 is always one half baud or very close thereto, since the error in the length of this interval is not cumulative. Therefore, the output of the summing circuit 106, which compares the voltages from the flip-flops 104 and 108, will average to a positive or negative value, depending on whether the flip-flop 104 is on for a longer or shorter period than the flip-flop 108, i.e., more or less than one half baud. This net positive or negative signal, after smoothing by the filter 112, alters the frequency of the oscillator 94 in the proper direction to make the "on" time of the flip-flop 104 one half baud, as indicated by a zero net voltage output from the summing circuit 106. The latter condition coincides with correct timing, since it occurs when the timing pulses are emitted by the timing circuit 56 one half baud after the trigger 50 shifts its state, i.e., at the end of each baud.

Should the receiver receive consecutive marks or spaces, the trigger 50 will not shift its state and therefore will not provide any time information. The timing circuit 56 handles this situation by having both flip-flops remain off, thereby contributing no input voltages to the summing circuit 106. The low pass filter 112 will retain its stored voltage for a period long enough to cover such intervals.

III. MULTIPLE CHANNEL SYSTEM

One may double the information rate of the system of FIGURE 1 by duplicating the transmitter and receiver at each end. The additional equipment will operate at a pair of frequencies different from those already being utilized, but it may be connected to the same antennas and use much of the other hardware of the original installation. Therefore, the increase in capacity of the system results in lower initial and maintenance costs per bit of information handled by it. A further increase to four times the original capacity, however, cannot be accomplished so readily in this manner. Considerable extra equipment is required, including filter-type directional couplers for combining the outputs of the four transmitters at each end while preventing interactions among them.

As an alternative, one might use each transmitter for two channels by having it transmit the frequencies of both channels simultaneously. However, it can be shown that when this is done, the peak transmitted power is considerably in excess of twice the power in each channel. Therefore, the power capability of the transmitter must exceed by a significant margin the power capabilities of individual transmitters used for the two channels. Thus, for the same power, the cost is much greater.

We have devised a coded system in which each transmitter handles a plurality of information channels but operates on only one frequency at a given time. In the case of two-channel transmission, quaternary coding is used, with the transmitter shifting among four different frequencies, each of which represents a different mark-space combination in the two channels. Thus, as seen from the coding table of FIGURE 5, a transmitter will transmit on frequency $f_1$ to indicate a mark in channel I and a mark in channel II. Transmission on frequency $f_2$ will indicate a mark in channel I and a space in channel II, and so on. The receiver described below for use with a multi-channel coded system makes use of frequency diversity in the same manner as the above-described single channel receiver, and therefore the frequencies $f_1$–$f_4$ should be spaced sufficiently far apart to obtain substantially uncorrelated fading.

In FIGURE 6 we have illustrated one method by which the binary information in channels I and II may be coded into four frequencies which are transmitted by the transmitter 10. Mark and space signals from the two channels are applied to AND gates 114, 116, 118 and 120 which are connected to operate switches 115, 117, 119 and 121 connecting individual exciters 122, 124, 126 and 128 to the transmitter. The exciters excite the transmitter 10 at the various frequencies $f_1$–$f_4$, respectively. For each combination of mark and space signals fed to the circuit, one AND gate will be activated to close a switch and connect to the transmitter the exciter whose frequency corresponds to the particular combination. For example, if the circuit receives a space in channel I and a mark in channel II, the gate 118 will be activated to connect the exciter 126. The transmitter 10 will then transmit at the frequency $f_3$. In FIGURE 5 it is seen that $f_3$ corresponds to this particular input combination. The signals in the two channels should be synchronized so that their baud intervals coincide.

By letting the individual exciters operate continuously instead of keying them on and off, continuity of phase is maintained in each one. This is important when using receiver weighting circuits which store phase information, since received energy having a substantially different phase than a signal received shortly before is treated as a probably spurious signal by such circuits.

IV. MULTIPLE CHANNEL RECEIVER

A receiver made according to our invention, adapted to handle quaternary coded signals, is schematically illustrated in FIGURE 7. As shown therein, the receiver includes an input and detecting section 129 and a decision section 131.

(A) *Input and detecting section*

Illustratively, the section 129 includes a pair of radio-frequency amplifiers 132 deriving their inputs from different antennas (FIGURE 1) and coupled to intermediate frequency units 134. Each unit 134 includes a mixer followed by an amplifier. The two input signals for each mixer are supplied by the preceding amplifier 132 and a local generator 136.

The intermediate frequency units 134 are followed by mixing units 138. Each of the mixing units includes an input filter passing an intermediate frequency corresponding to one of the radio signal frequencies $f_1$–$f_4$. Thus, each intermediate frequency unit 134 feeds four mixing units 138, one for each of the signal frequencies. Each of the mixing units 138 also contains a mixer deriving one of its input signals from the generator 136 for reducing the signal to a still lower intermediate frequency.

The outputs from the mixing units 138 are connected to separate weighting units 140, similar to the weighting units 36 and 38 of FIGURE 2. The output signal of each weighting unit is proportional to the signal-to-noise ratio in its input. Each unit 140 includes mixers which mix the signal from the preceding mixing unit 138 with a signal from the generator 136. The mixing sequence in each weighting unit is arranged to provide an output frequency equal to the frequency applied to the weighting units from the generator 136. The output signal from each weighting unit 140 is additively combined with the signal from the other weighting unit handling the same signal frequency, and the individual sums are then applied to phase detector 142.

While we have illustrated only two amplifiers 132, it will be understood that as many such amplifiers may be provided as the number of receiving antennas (four in the system illustrated in FIGURE 1), each amplifier 132 being followed by a set of mixing units 138 and weighting units 140 with the outputs of the weighting units all being combined in the manner shown in FIGURE 7. While we prefer to use the above circuit arrangement in the initial stages of the receiver, other circuits may be used, although the respective detector output signals should reflect the relative strengths of the receiver input signals at the various frequencies.

Each of the detectors 142 is followed by a matched filter 144 similar to the filter 44 of FIGURE 2, and the filters 144 are followed by identical biasing units 146, 148, 150 and 152. The outputs of the biasing units are connected to a group of OR gates 154–160 which serve to decode the quaternary coded signals from the four frequency channels into mark and space signals in the two information channels according to the coding scheme of FIGURE 5. Gates 154 and 156 pass mark and space signals, respectively, in channel I, and gates 158 and 160 pass the mark and space signals in channel II. The inputs to the gate 154 are from the biasing units 146 and 148 which are in the $f_1$ and $f_2$ frequency channels, and as shown in FIGURE 5, the frequencies $f_1$ and $f_2$ correspond to a mark in channel I. Similarly, the inputs to the space gate 156 of information channel I are from the biasing units 150 and 152 in the $f_3$ and $f_4$ frequency channels. The inputs to gates 158 and 160 are also arranged according to the coding of FIGURE 5.

The biasing units 146–152 subtract from the signals passing therethrough one half the expected amplitudes of these signals, and after passing through the OR gates, the mark and space signals in the respective channels are compared by difference amplifiers 162 and 164. The outputs of the amplifiers 162 and 164 are applied to triggers 166 and 168 which function in the same manner as the trigger 50 of FIGURE 2. The conductive state of each trigger depends on whether the mark or space signal, after adjustment by the corresponding biasing unit, predominates in the input of the preceding difference amplifier. When the mark signal predominates in channel I, the trigger 166 opens a mark gate 170, and when the space signal predominates, the trigger opens a space gate 172. A mark gate 174 and space gate 176 in information channel II are similarly actuated by the trigger 168. When actuated, the gates 170–176 pass pulses from a timing circuit 178 to provide in each channel an output of the same type as that provided by the receiver of FIGURE 2.

(B) *Decision section*

The decision-making section 131 of the receiver of FIGURE 7 is shown in greater detail in FIGURE 8. Each of the biasing units 146–152 includes a biasing capacitor C7 paralleled by a resistor R14 and connected in series between a matched filter 144 (FIGURE 7) and an OR gate 154–160. A storage capacitor C8 and a resistor R15 are connected in parallel between the input terminal of each biasing unit and a switch S3, which when operated, connects these elements to ground. A resistor R16, also connected to the switch S3, forms a voltage divider with the resistor R14.

Each of the normally open switches S3 is closed by a pulse from one of a series of AND gates 180, 182, 184 and 186. Each of the AND gates emits an output pulse whenever the receiver decides that during the preceding baud a signal was received at the frequency associated with the biasing unit connected to the gate. For example, if the receiver indicates a mark in channel I and a space in channel II, the baud-end pulse from the timing circuit 178 (FIGURE 7) will be passed by the gates 170 and 176, both of which are connected to the inputs of the AND gate 182. The pulse will therefore be transmitted by the gate 182 to close the switches S3 of the biasing unit 148. This will cause the biasing unit 148 to store the amplitude of the signal received at the frequency $f_2$ which, according to FIGURE 5, was transmitted in order to signify a mark in channel I and a space in channel II.

More specifically, when the switch S3 of the biasing unit 148 is closed, the capacitor C8 of the biasing unit is connected directly across the output of the preceding matched filter 144 and thereby charges to the voltage at that point. As pointed out above in connection with the biasing unit 46 of FIGURE 3, this voltage, applied to the capacitor C8 at the end of a baud, is a measure of the strength of the signal received at the particular frequency, $f_2$, associated with the unit 148. The switch S3, which may have the same construction as the switch S1 of FIGURE 4, is closed only for the brief instant necessary to charge or discharge the capacitor C8 to the correct voltage level. The resistors R14 and R16, connected in series across the capacitor C8, have equal values, and therefore approximately one half the voltage across this capacitor appears across the resistor R14. Because of the presence of the capacitor C7, the voltage across the resistor R14 does not immediately take on this value, but rather, tends toward it.

The charge and discharge time constant of the capacitor C7 as determined by the values of the resistors R14, R15 and R16 is equal to a fairly large number of baud lengths, e.g., 40 to 80, and therefore the voltage across the capacitor C7 represents one half of a weighted average of the previous 10–20 or so signals received on the frequency corresponding to the particular biasing unit. The most recent signals are given the greatest weight. Thus, again the weighted average is the expected voltage of the next incoming signal transmitted at the frequency $f_2$. The voltage across the capacitor C7, which is one half the expected voltage, is relatively independent of noise which may significantly affect the amplitude of a few of the stored signals without unduly changing the weighted average; yet it can change fast enough to follow the fading of the signals due to variations in transmission conditions.

Thus, each signal passing through one of the biasing units 146–152 is diminished by one half its expected amplitude before reaching one of the gates 154–160. Each of these gates comprises a pair of diodes D1 and D2 connected respectively to the two biasing units whose output signals indicate the bits of information with which the particular gate is associated. Thus, the diodes D1 and D2 of the gate 154 are connected to the biasing units 146 and 148 associated with a mark in channel I, and the diodes D1 and D2 of the gate 156 are connected to the biasing units 150 and 152 associated with a space in this channel. The output signal from each gate is connected to the input of one of the difference amplifiers 162 and 164. A resistor R17 in each gate is connected to the negative terminal of a power supply illustratively shown as a battery 188. The circuit illustrated in FIGURE 8 assumes positive voltage outputs from the matched filters 144, although it will be apparent that the receiver can be arranged for negative voltage, in which case the polarities of the diodes and the battery 188 would be reversed.

The battery 188 applies forward bias to the diodes D1 and D2 in each OR gate, but the value of the resistors R17 is sufficiently high to prevent current from the battery 188 from appreciably affecting the charges on the capacitors C7 in the biasing units 146–152. The resistors R17 also serve to isolate the battery from the inputs of the difference amplifiers 162 and 164.

If a signal is received at the frequency $f_1$, it will pass through the biasing unit 146 and have it voltage adjusted therein, and, if it is of sufficient strength, it then passes through the diodes D1 in the OR gates 154 and 158 to the difference amplifiers 162 and 164. The output voltages of the difference amplifiers will be such as to impose the mark states on the triggers 166 and 168. Timing pulses from the circuit 178 (FIGURE 7) will then be passed by the mark gates 170 and 174 to register marks in both channels I and II.

If during the same baud the receiver receives energy at the frequency $f_3$, a signal will be passed by the biasing unit 150 through the diode D1 of the space OR gate 156 to the difference amplifier 162. The polarity of the output signal of the amplifier 162 will depend on which of the incoming signals reaching the gates 154 and 156 is greater after being diminished by one half its expected amplitude, the signal at the frequency $f_1$ passed by the biasing unit 146, or at the frequency $f_3$ passed by the unit 150. If the voltage at the gate 154 is greater, the polarity of the amplifier 162 will, as stated above, provide a mark indication in channel I. On the other hand, if the voltage in the gate 156 is greater, the space state will be imposed on the trigger 166, and a space will be indicated.

Still referring to FIGURE 8, of the voltages applied to the diodes D1 and D2 in each of the OR gates 154–160, the voltage which is more positive (or less negative) will reverse bias the other of the two diodes and cut it off. Therefore, only the more positive of the two voltages will be passed to the difference amplifier to influence its output polarity. In other words, each difference amplifier compares only the highest voltages applied to its associated mark and space gates. Each of the gates 154–160 may be replaced by a summing circuit which sums both its input signals. In that case, each input to one of the difference amplifiers will be proportional to the sum of the voltages indicating a mark and a space associated with that input. However, if this is done, additional noise may be introduced into the decision making circuits.

The reason for applying negative bias to the gates 154 and 160 of FIGURE 8 is as follows. Suppose that a complete fade occurs on frequency $f_1$, but not on the other frequencies $f_1$–$f_2$. Then the expected amplitude of the signal received on $f_1$ is zero, and the bias introduced by the corresponding biasing unit 146 is zero. If under these circumstances $f_1$ is transmitted, the output of the biasing unit 146 will be zero. However biasing units 148–152 contain bias voltages, and, in the absence of corresponding input signals, their output voltages are negative. Thus, in gates 154 and 158 the more positive input is zero, so that the output of each of these gates is zero. In gates 156 and 160, all the inputs are negative, and these gates must provide negative outputs in order to be less positive than the outputs of the gates 154 and 158 and thereby permit the difference amplifiers to indicate by their outputs that $f_1$ was transmitted. If the diodes D1 and D2 in the gates are not negatively biased, the gates 156 and 160 will be unable to provide negative outputs, and their output voltages will be zero in the above case. The required information for a decision will then not be delivered to the difference amplifiers.

As seen in FIGURE 7, the timing circuit 178 includes differentiators 181 and 183 connected to the respective outputs of the trigger 166 and differentiators 185 and 187 connected to the outputs of the trigger 168. The outputs of the differentiators 181 and 183 are connected to an OR gate 188, and the differentiators 185 and 187 are connected to an OR gate 190. Thus, whenever the trigger 166 shifts from one state to another, i.e., from a mark to space indication or vice versa, a pulse will appear at the output of the OR gate 188. Similarly, changes in the state of the trigger 168 result in pulses from the gate 190. The pulses from the gates 188 and 190 are connected to turn on flip-flops 192 and 194, respectively. The flip-flops are turned off by pulses from a pulse generator 196 triggered by an oscillator 198 whose frequency nominally equals the baud rate of the signals processed by the receiver.

Still referring to FIGURE 7, output pulses emitted by the flip-flops 192 and 194 when they are turned off turn on a pair of flip-flops 200 and 202, respectively. The flip-flops 200 and 202 are turned off by pulses from the generator 196 delayed a half baud by a delay unit 204. The flip-flops 192 and 194 transmit constant voltages of one polarity to a summing unit 206 during the intervals that they are on. The flip-flops 200 and 202 transmit voltages at the same level but opposite polarity to the summing unit 206 when they are on. The output of the summing unit is passed through a low pass filter 208 to a frequency controlling element in the oscillator 198.

Thus, the operation of the timing circuit 178 is similar to that of the timing circuit 56 of FIGURE 2. Considering first the flip-flops 192 and 200, if the frequency of the oscillator 198 is correct, the pulses from the generator 196 will occur at the end of each baud. As explained above, the trigger 166 nominally changes state at the mid-point of a baud, and therefore the interval between the time when the flip-flop 192 is turned on by a change of state of the trigger 162 and off by a pulse from the generator 196 is one half baud. The one half-baud delay of the unit 204 maintains the "on" time of the flip-flop 200 at one half baud, and therefore, if the frequency is correct, the average voltage applied to the summing unit 206 from the flip-flops 192 and 200 will be zero, as reflected at the output of the low pass filter 208, which operates as an averaging device. If the frequency of the oscillator 198 varies from the correct value, there will be a non-zero average voltage at the output terminals of the summing unit 206, and an appropriate change in the oscillator frequency will be effected thereby.

The operation of the flip-flops 194 and 202 in conjunction with the trigger 168 is the same as that of the flip-flops 192 and 200. Thus, the summing unit 206 receives information from both information channels of the receiver, thereby providing timing accuracy which is considerably better than the accuracy obtainable from either one of the channels alone.

The use of coding in conjunction with our novel decision-making circuits provides the important advantage of doubling the information capacity of the system and maintaining the same reliability as a single channel system with substantially less than twice the single channel transmitter power.

V. COMPARISON OF SINGLE- AND MULTIPLE-CHANNEL RECEIVERS

It should be noted that the biasing systems of the receivers illustrated in FIGURES 2 and 7 operate according to the same principle, although the various voltages are added and subtracted in different order. Thus, considering a single information channel in FIGURE 7 and assuming the use of but two frequencies to provide mark-space information in the channel, it is seen that, first the amplitudes of the received signals at the two frequencies are diminished by one half their expected values, and then the results of the subtractions are subtracted in a difference amplifier. The complete operation may be represented algebraically by, $$(A-C)-(B-D) \qquad (1)$$

where,

A and B are the detected signal strengths at the two frequencies, and

C and D are one half the expected signal strengths at the frequencies corresponding to A and B, respectively.

In the circuit of FIGURE 2, one of the incoming signal strengths is subtracted from the other, and the same operation is performed on the expected signal strengths. Finally, the result of the second subtraction is subtracted from the result of the first subtraction. This sequence may be represented by, $$(A-B)-(C-D) \qquad (2)$$

Both (1) and (2) reduce to: $A-B-C+D$, and therefore the two sequences provide substantially identical results.

It will be apparent that other sequences might also be used, e.g., $(A+D)-(B+C)$. Furthermore, by suitable arrangement of circuit elements, any of the various sequences can be used in either a single-channel or coded multi-channel receiver. While the quantities C and D should ordinarily be one half the expected received amplitudes in the receivers described above, there may be conditions under which they should depart from this value.

Also, in some circuit configurations, a different relationship between C and D and the expected amplitudes may be desirable. Thus, if noncoherent rather than coherent detection is used, the biasing level should depend not only on the estimated amplitudes of the detected signals, but also on their actual amplitudes. This is a consequence of the fact that noise at the input of the receiver will, in the absence of a transmitted signal, cause both positive and negative voltages at the output of a coherent detector. Over a period of one baud, these voltages will substantially cancel, i.e., average out to about zero. In a non-coherent detector, on the other hand, all the noise received in the absence of a transmitted signal causes a detector output of the same polarity. Therefore, the output of the matched filter will be proportional to the received noise energy. It will be apparent that the biasing system then has to take into account the differences in the detected amplitudes in the various frequency channels as well as the differences in the expected amplitudes.

It should also be understood that the actual biasing may be performed by circuits other than the straight subtraction circuits described above. For example, gain control devices or voltage dividers controlling the amplitudes of the detected signals in the various frequency channels might be regulated in accordance with the expected amplitudes in such manner that in each of the channels the amplitude reflects the received amplitude less a given portion of the expected amplitude therein.

VI. SUMMARY

Thus, we have described an improved communications receiver adapted for detection of frequency shift signals subject to multiple path propagation. The receiver is provided with novel biasing circuits which effectively modify the amplitudes of the received signals in the various frequency channels to improve the reliability of the decision as to which frequency has actually been transmitted. The biasing circuits store the received amplitudes and average them over a significant period of time to derive expected amplitudes at the various frequencies. When the receiver is to process information in a single information channel, each of the received amplitudes is reduced by one half the expected amplitude at that frequency, and the results of the subtractions are then compared, the predominant result indicating a mark or space as the case may be.

We have also described a system capable of processing signals in a number of information channels. The system uses a transmitter whose output shifts among a number of different frequencies, each of which corresponds to a different mark-space combination in the various information channels. The receiver in the multiple channel system compares the amplitudes at the various frequencies corresponding to marks in the various channels with those corresponding to spaces, the signals having first been modified by subtraction of portions of their expected amplitudes, as described above. The use of coding in this manner permits substantial simplification of transmitting equipment, as well as a decrease in the transmitter power required for a given system reliability.

The receivers described above incorporate novel timing circuits which fix the timing of baud-end pulses by comparing a one half-baud period, as defined by repetition rate of locally generated pulses, with the average of a number of one half-baud periods defined by the change of state of a trigger circuit responding to the relative amplitudes of the modified signals in the various frequency channels. This enhances the reliability of the receiver, since, as pointed out above, the pulses are used to indicate the decision of the receiver as to whether a mark or space has been transmitted, and the optimum time for this decision is at the end of each baud.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

We claim:

1. A frequency shift communications system comprising a transmitter adapted to shift among frequencies including first and second frequencies, transmission on said first frequency corresponding to a first character in an information channel and transmission of said second frequency corresponding to a second character in said channel, said first and second frequencies being subject to substantially uncorrelated fading, a receiver adapted to detect energy at said first and second frequencies, said receiver including means for estimating for each of said frequencies the amplitude of a received signal at that frequency, means for providing a combined signal, $$S=A-B-C+D$$

where, A is the amplitude of the received signal at said first frequency, B is the amplitude of the received signal at said second frequency, C is a portion of the expected amplitude at said first frequency, and D is a portion of the expected amplitude at said second frequency, and means for determining whether S is positive or negative.

2. The combination defined in claim 1 in which said combining means is adapted to provide a first signal $(A-B)$ and a signal $(C-D)$ and includes means for subtracting $(C-D)$ from $(A-B)$.

3. The combination defined in claim 1 in which said combining means is adapted to provide a signal $(A-C)$ and a signal $(B-D)$ and includes means for subtracting $(B-D)$ from $(A-C)$.

4. A wireless frequency shift keying system adapted to convey information in a plurality of information channels, said system comprising a transmitter adapted to shift among a plurality of frequencies, each of said frequencies corresponding to a different combination of first and second characters in said channels, a receiver sensitive to signals at said frequencies, said receiver including a signal-combining circuit for each of said channels, each of said combining circuits being adapted to provide a signal, $$S=A-B-C+D$$

where, A is the amplitude of the received signals at at least one frequency corresponding to a first character, B is the combined received signal amplitude at at least one frequency corresponding to a second character, C is proportional to the average of the estimated amplitudes of all the frequencies comprising A, and D is proportional to the average of the estimated amplitudes of the frequencies comprising B, and means for determining whether S is positive or negative.

5. The combination defined in claim 4 in which each of said combining circuits forms signals A and B corresponding to the combined amplitudes of all the received signals corresponding to first and second characters in the information channel in which the combining circuit operates.

6. The combination defined in claim 4 including signal storage means whose stored contents are said averages, said signal storage means having discharge time constants associated therewith, said transmitter continuously repeating the transmission of said first and second characters within said time constants associated with them.

7. The combination defined in claim 4 in which each of said combining circuits forms a signal $(A-C)$ and $(B-D)$ and performs the operation, $(A-C)-(B-D)$.

8. The combination defined in claim 7 in which the signals A and B are the combined amplitudes of all the received signals corresponding to first and second characters respectively in the various information channels.

9. The combination defined in claim 7 in which said transmitter is adapted to shift among at least four frequencies corresponding to different mark-space combinations in at least first and second information channels, each of the signals A corresponding to the combined amplitudes of at least two received signals corresponding to a mark and each of the signals B corresponding to the combined amplitude of at least two received signals corresponding to a space.

10. The combination defined in claim 9 including signal storage means whose stored content corresponds to said averages, said storage means having discharge time constants associated therewith, said transmitter repeating mark and space signals within said time constants associated therewith.

11. A wireless communications receiver adapted to receive and process frequency shift signals, said receiver comprising means for detecting energy at first and second frequencies corresponding to marks and spaces in an information channel, means for estimating the amplitude of a received signal at each of said frequencies, combining means adapted to provide a combined signal, $$S=A-B-C+D$$

where, A is the amplitude of the received signal at said first frequency, B is the amplitude of the received signal at said second frequency, C is a portion of the expected amplitude at said first frequency, and D is a portion of the expected amplitude at said second frequency, and means for determining whether S is positive or negative and thus whether said first or second frequency has been transmited.

12. The combination defined in claim 11 in which each of said means for estimating an amplitude at one of said frequencies stores the weighted average amplitude of received signals determined to have been transmitted.

13. The combination defined in claim 12 in which each of said amplitude estimating means gives the opposite effect to received energy at said first frequency from energy received at said second frequency.

14. The combination defined in claim 11 including means for determining a quantity $A-B$ proportional to the average difference between the amplitudes of the received signals at said first and second frequencies over a period of one baud.

15. The combination defined in claim 14 including means for indicating at the end of each baud whether S is positive or negative.

16. The combination defined in claim 11 in which each of said means for estimating an amplitude at one of said frequencies stores the weighted average amplitude of signals received at said one frequency and determined by said determining means to have been transmitted, the weight given said signals in said average decreasing with priority thereof.

17. A wireless communications receiver adapted to process frequency shift signals transmitted on first and second frequencies, said receiver including an input section adapted to detect signals at each of said frequencies, means for substracting the detected second frequency signal from the detected first frequency signal to provide a combined signal, averaging means adapted to provide a signal indicative of the average of said combined signal over a period of one baud, means for estimating the amplitudes of received signals at said first and second frequencies and subtracting a portion of the estimated amplitude at said second frequency from a similar portion of the estimated amplitude at said first frequency, and means for subtracting the difference in said estimated amplitudes from the output amplitude of said averaging means.

18. The combination defined in claim 17 including decision means for determining whether the difference signal resulting from said final subtraction is positive or negative, a positive signal indicating transmission on said first frequency and a negative difference signal indicating transmission on said second frequency.

19. The combination defined in claim 18 including a timing circuit adapted to provide an output indication from said decision means at the end of each baud.

20. The combination defined in claim 19 in which said means for estimating amplitudes is adapted to determine the weighted average difference in amplitudes of signals at said first and second frequencies determined by said decision means to have been transmitted, said average being taken over a plurality of bauds, the weight of each received signal in said average diminishing according to its relative priority of reception.

21. A wireless communications receiver adapted for the reception of frequency shift signals at first and second frequencies, said receiver comprising means for detecting energy at said first and second frequencies, means for subtracting the detected amplitude at said second frequency from the detected amplitude at said first frequency, means for estimating the amplitude of a received signal at each of said frequencies and subtracting one half the estimated amplitude at said second frequency from one half the estimated amplitude at said first frequency, means for performing a final subtraction of the difference between said estimated half amplitudes from a difference between said detected amplitudes, decision means adapted to determine whether the difference signal resulting from said final subtraction is positive or negative, a positive difference signal indicating transmission on said first frequency and a negative difference signal indicating transmission on said second frequency, and a timing circuit adapted to provide an output indication from said decision means at the end of each baud.

22. A wireless communications receiver adapted to receive frequency shift signals conveying information in a plurality of information channels, each of said channels having information in binary form, there being a plurality of signal frequencies, transmission on each of said frequencies corresponding to a unique combination of first and second characters in said channels, said receiver comprising a detector for each of said frequencies, averaging means connected to the output of each of said detectors, each of said averaging means providing a signal indicative of the amplitude of the input signal thereto over a period of one baud, prediction means corresponding to each of said signal frequencies, each of said prediction means providing a signal indicative of a portion of the expected amplitude of received energy at the corresponding signal frequency, means for subtracting the output signal of each prediction means from the output signal of the averaging means corresponding thereto, thereby to provide a plurality of difference signals, and decision means in each of said information channels for comparing a difference signal of at least one of said signal frequencies corresponding to a first character in said channel with at least one of said difference signals corresponding to a second character in said channel.

23. The combination defined in claim 22 in which each decision means in a channel compares only the greatest difference signal corresponding to a first character in said channel with the difference signal most strongly indicating a second character in said channel.

24. The combination defined in claim 22 including timing means adapted to provide an indication from said decision means at the end of each baud.

25. The combination defined in claim 22 in which each of said prediction means includes a first capacitor, means for charging said capacitor to the output voltage of the corresponding averaging means at the end of each baud in which said decision means determines that a signal was transmitted on the frequency corresponding to said averaging means, a second capacitor, a first resistor connected in series with second capacitor across said first capacitor, a second resistor connected across said second capacitor, the capacitances of said capacitors and the resistances of said resistors being such that the discharge time constant of said second capacitor is substantially greater than the information rate in each of said channels and less than the fading rate at said signal frequencies, the voltage across said second capacitor being proportional to the expected amplitude of a signal at the signal frequency to which the prediction means corresponds, said second capacitor being connected between the output of the corresponding averaging means and an input of the corresponding decision means.

26. A wireless communications receiver adapted to receive frequency shift signals conveying information in a plurality of information channels simultaneously over at least three as following claims signal frequencies, each of said channels having information in binary form, transmission on each of said frequencies corresponding to a unique combination of first and second characters in said channels, said receiver comprising means for detecting energy at each of said signal frequencies, a matched filter connected to the output of each of said detecting means, each of said matched filters having a storage capacity of one baud, prediction means providing signals indicative of the expected amplitudes of detected signals at the various signal frequencies, means for providing difference signals corresponding to the output signals of said matched filters and the respective prediction means corresponding thereto, a decision circuit for each of said information channels, each of said decision circuits being adapted to compare the difference signal most strongly indicating a first character in its channel with the difference signal most strongly indicating a second character therein, and timing means adapted to provide output signals from said decision means at the end of each baud.

27. The combination defined in claim 26 in which said prediction means provide output signals whose amplitudes are substantially one half the expected amplitudes of signals appearing at the outputs of the respective matched filters.

28. A wireless frequency shift keying system adapted to convey information in a plurality of information channels, said system comprising a transmitter adapted to shift among a plurality of frequencies, each of said frequencies corresponding to a different combination of first and second characters in said channels, a receiver sensitive to signals at said frequencies, said receiver including a signal-combining circuit for each of said channels, each of said combining circuits being adapted to combine in a subtractive manner the amplitudes at a first frequency representing a first character and a second frequency repesenting a second character, decision means for each channel adapted to determine whether the combined signals indicating said first and second characters are above or below a decision level and biasing means for adjusting the decision level in each channel according to the expected amplitudes of signals indicating said first and second characters.

29. In a wireless communications receiver adapted to process frequency shift signals transmitted on at least first and second frequencies, and including decision means for determining whether each baud of the received signal corresponds to a first or second transmitted character, the combination including a timing circuit adapted to provide an output indication from said decision means at the end of each baud, said decision means having two states corresponding to said first and second characters, said timing circuit including a pulse generator adapted to emit pulses at a rate nominally equal to the baud rate of the signals received by said receiver, first and second bistable devices having first and second states, means for imposing said first state on said first bisable device whenever said decision means shifts from one of its state to the other, mean for imposing the second state on said first bistable device whenever a pulse is emitted by said generator, means for imposing the first state on said second bistable device whenever said first bistable device shifts from its first to its second state, means for imposing the second state on said second bistable device at the end of a one half-baud interval following each of said pulses from said generator, said bistable devices emitting signals coexistensive with the intervals they are in said first state, means for generating a control signal proportional to the average difference between the time intergrals of said signals from said bistable devices over a plurality of baud intervals, controlling means adapted to control the repetition rate of said pulse generator in such manner as to minimize said control signal, and means controlled by said pulse generator for indicating the state of said decision means.

30. A wireless communications receiver adapted to process frequency shift signals transmitted on first and second frequencies, said receiver including an input section adapted to detect signals at each of said frequencies, means for subtracting the detected second frequency signal from the detected first frequency signal to provide a combined signal, averaging means adapted to provide a signal indicative of the average of said combined signal over a period of one baud, means for estimating the amplitudes of received signals at said first and second frequencies and subtracting a portion of the estimated amplitude at said second frequency from a similar portion of the estimated amplitude at said first frequency, and means for subtracting the difference in said estimated amplitudes from the output amplitude of said averaging means, decision means having two states corresponding to the positive and negative polarities of said difference signal resulting from said final subtraction, a timing circuit including a pulse generator adapted to emit pulses at a rate nominally equal to the baud-rate of the signals received by said receiver, first and second bistable devices having first and second states, means for imposing said first state on said first bistable device whenever said decision means shifts from one of its states to the other, means for imposing the second state on said first bistable device whenever a pulse is emitted by said generaor, means for imposing the first state on said second bi-stable device whenever said first bistable device shifts from its first to its second state, means for imposing the second state on said second bistable device at the end of a one half-baud interval following each of said pulses from said generator, said bistable devices emitting signals coextensive with the intervals they are in said first state, means for generating a control signal proportional to the average difference between the time integrals of said signals from said bistable devices over a plurality of baud intervals, and controlling means adapted to control the repetition rate of said pulse generator in such manner as to minimize said control signal.

31. A wireless communications receiver adapted for the reception of frequency shift signals at first and second frequencies, said receiver comprising means for detecting energy at said first and second frequencies, means for subtracting the detected amplitude at said second frequency from the detected amplitude at said first frequency, a matched filter having a one-baud capacity connected to receive said difference between said detected amplitudes, the output of said matched filter thereby being indicative of the average difference between energy detected at said first and second frequencies over a period of one baud, means for estimating the amplitude of a received signal at each of said frequencies and subtracting one half the estimated amplitude at said second frequency from one half the estimated amplitude at said first frequency, means for performing a final subtraction of the difference between said estimated half amplitudes from the output signal of said matched filter, decision means adapted to determine whether the difference signal resulting from said final subtraction is positive or negative, a positive difference signal indicating transmission on said first frequency and a negative difference signal indicating transmission on said second frequency, and a timing circuit adapted to provide an output indication from said decision means at the end of each baud.

32. A wireless communications receiver adapted to receive frequency shift signals conveying information in a plurality of information channels, each of said channels having information in binary form, there being a plurality of signal frequencies, transmission on each of said frequencies corresponding to a unique combination of first and second characters in said channels, said receiver comprising a detector for each of said frequencies, averaging means connected to the output of each of said detectors, each of said averaging means providing a signal indicative of the amplitude of the input signal thereto over a period of one baud, prediction means corresponding to each of said signal frequencies, each of said prediction means providing a signal indicative of a portion of the expected amplitude of received energy at the corresponding signal frequency, means for subtracting the output signal of each prediction means from the output signal of the averaging means corresponding thereto, thereby to provide a plurality of difference signals, and decision means in each of said information channels for comparing a difference signal of at least one of said signal frequencies corresponding to a first character in said channel with at least one of said difference signals corresponding to a second character in said channel, said decision means having two states corresponding to the positive and negative polarities of said difference signal resulting from said final subtraction, a timing circuit, said timing circuit including a pulse generator adapted to emit pulses at a rate nominally equal to the baud rate of the signals received by said receiver, first and second bistable devices having first and second states, means for imposing said first state on said first bistable device whenever said decision means shifts from one of its states to the other, means for imposing the second state on said first bistable device whenever a pulse is emitted by said generator, means for imposing the first state on said second bistable device whenever said first bistable device shifts from its first to its second state, means for imposing the second state on said second bistable device at the end of a one half-baud interval following each of said pulses from said generator, said bistable devices emitting signals coextenisve with the intervals during which they are in said first state, means for generating a control signal proportional to the average difference between the time integrals of said signals from said bistable devices over a plurality of baud intervals, and controlling means adapted to control the repetition rate of said pulse generator in such manner as to minimize said control signal.

33. A wireless communications receiver adapted to receive frequency shift signals conveying information in a plurality of information channels, each of said channels having information in binary form, there being a plurality of signal frequencies, transmission on each of said frequencies corresponding to a unique combination of first and second characters in said channels, said receiver comprising a detector for each of said frequencies, matched filters having a storage capacity of one baud connected to the output of each of said detectors, each of said averaging means providing a signal indicative of the amplitude of the input signal thereto over a period of one baud, prediction means corresponding to each of said signal frequencies, each of said prediction means providing a signal indicative of a portion of the expected amplitude of received energy at the corresponding signal frequency, means for subtracting the output signal of each prediction means from the output signal of the averaging means corresponding thereto, thereby to provide a plurality of difference signals, and decision means in each of said information channels for comparing a difference signal of at least one of said signal frequencies corresponding to a first character in said channel with at least one of said difference signals corresponding to a second character in said channel.

References Cited by the Examiner

UNITED STATES PATENTS

| | | | |
|---|---|---|---|
| 2,928,897 | 3/60 | Koolhof | 178—69 |
| 2,999,925 | 9/61 | Thomas | 325—320 |

OTHER REFERENCES

Article, by Sprague, "Frequency-Shift . . ." Electronics, Nov. 1944, pp. 126–131.

DAVID G. REDINBAUGH, *Primary Examiner.*

GEORGE WESTBY, *Examiner.*